US012507015B2

(12) United States Patent
Xu

(10) Patent No.: US 12,507,015 B2
(45) Date of Patent: Dec. 23, 2025

(54) DYNAMIC CONTROL FOR SELECTIVE ACOUSTIC OPTIMIZATION OF THERMALLY OR POWER LIMITED SPEAKER SYSTEMS

(71) Applicant: Cirrus Logic International Semiconductor Ltd., Edinburgh (GB)

(72) Inventor: Zhengyi Xu, Newbury (GB)

(73) Assignee: Cirrus Logic Inc., Austin, TX (US)

( * ) Notice: Subject to any disclaimer, the term of this patent is extended or adjusted under 35 U.S.C. 154(b) by 201 days.

(21) Appl. No.: 18/334,795

(22) Filed: Jun. 14, 2023

(65) Prior Publication Data

US 2024/0422479 A1 Dec. 19, 2024

(51) Int. Cl.
*H04R 9/02* (2006.01)
*H04R 29/00* (2006.01)

(52) U.S. Cl.
CPC .......... *H04R 9/022* (2013.01); *H04R 29/001* (2013.01); *H04R 2430/01* (2013.01)

(58) Field of Classification Search
CPC .................................................. H04R 3/007
See application file for complete search history.

(56) References Cited

U.S. PATENT DOCUMENTS

2018/0014121 A1* 1/2018 Lawrence ................ H04R 3/04
2019/0199307 A1* 6/2019 Button .................. H04R 3/007
2023/0199384 A1 6/2023 Roberto et al.

FOREIGN PATENT DOCUMENTS

EP 2712209 A1 1/2021
WO 2014045123 A2 3/2014

OTHER PUBLICATIONS

Combined Search and Examination Report under Sections 17 and 18(3), UKIPO, Application No. GB2405082.5, mailed Aug. 28, 2024.

* cited by examiner

*Primary Examiner* — Mark Fischer
(74) *Attorney, Agent, or Firm* — Jackson Walker L.L.P.

(57) ABSTRACT

An audio system may include an audio transducer, a thermal protection subsystem configured to protect the audio transducer from overheating, and a control subsystem communicatively coupled to the thermal protection subsystem and configured to receive an audio signal for playback at the audio transducer, determine an audio heating metric indicative of a predicted effect of the audio signal on the audio transducer, and control operation of the thermal protection subsystem based on the audio heating metric.

8 Claims, 7 Drawing Sheets

DYNAMIC CONTROL FOR SELECTIVE ACOUSTIC OPTIMIZATION OF THERMALLY OR POWER LIMITED SPEAKER SYSTEMS

RELATED APPLICATION

The present disclosure is related to U.S. patent application Ser. No. 17/735,419, filed May 3, 2022, which is incorporated by reference herein in its entirety.

FIELD OF DISCLOSURE

The Present Disclosure Relates in General to Acoustic Optimization of Acoustic Speakers in Thermally Limited and/or Power Limited Speaker Systems.

BACKGROUND

Many audio systems, including those in mobile devices such as smart phones, utilize micro-speakers, due to physical space constraints in such systems. Users of micro-speakers may often desire top-end loudness (e.g., maximum volume), maintaining timbre balance and audio dynamics, and significant presence of bass.

However, such desires often directly clash with a "thermal limiter bottleneck," which may occur as many audio systems include thermal protection for speakers, to prevent overheating and damage to speakers or devices including such speakers. Micro-speaker sensitivity may roll off steeply (e.g., at −12 dB/octave) below a resonant frequency of the micro-speaker. As a result, more power may be needed at bass frequencies in order to produce a desired sound pressure level. The desire for top-end loudness may be in direct opposition to the desire for bass, particularly when thermally limited.

A micro-speaker may be most efficient in its passband. Micro-speakers often have poor acoustical response, especially at low frequencies, due to relatively small surface area, low maximum displacement, and high resonant frequency. Bass frequencies may be boosted to respond to such limitations, but such boosting may decrease acoustic efficiency, drive up power consumption, and overheat a speaker.

Further, music often has a "pink" or 1/f spectrum (where f is playback frequency). Because micro-speakers may be most efficient in their passband region, most power driven to a micro-speaker may be in an acoustically inefficient region, especially when bass is boosted and the passband is attenuated by an equalizer.

Selective acoustic optimization, such as that described in U.S. patent application Ser. No. 17/735,419, may overcome some of the disadvantages and problems associated with undesirable dynamics and thermal protection of a micro-speaker. However, many existing approaches to selective acoustic optimization utilize fixed designs that constrain power saving performance. Aggressive selective acoustic optimization tuning in such approaches may minimize power consumption at the cost of timbre quality degradation in audio. Thus, generic conservative tuning is often used to protect audio quality in the worst-case scenario.

In addition, existing approaches are driven by an estimation of a voice coil temperature of a micro-speaker with a large time constant. While use of a large time constant has the benefit of limiting the impact of selective acoustic optimization on listening experience, such use introduces long delays before selective acoustic optimization is engaged, which limits power saving performance. Further, using existing approaches, over-compensation may occur when switching from a quiet section of audio to a loud section due to such large time constant.

Further, different playback waveforms may have different acoustic characteristics. For example, some playback waveforms may allow for more power and/or coil temperature reduction with less impact on listening experience due to psychoacoustic properties of the playback waveform. Other waveforms may be more sensitive to temperature. Thus, relying on a fixed configuration based on feedback temperature may not be optimal in all cases.

SUMMARY

In accordance with the teachings of the present disclosure, the disadvantages and problems associated with undesirable dynamics and thermal protection of a micro-speaker may be reduced or eliminated.

In accordance with embodiments of the present disclosure, an audio system may include an audio transducer, a thermal protection subsystem configured to protect the audio transducer from overheating, and a control subsystem communicatively coupled to the thermal protection subsystem and configured to receive an audio signal for playback at the audio transducer, determine an audio heating metric indicative of a predicted effect of the audio signal on the audio transducer, and control operation of the thermal protection subsystem based on the audio heating metric.

In accordance with these and other embodiments of the present disclosure, a method may include receiving an audio signal for playback at an audio transducer, determining an audio heating metric indicative of a predicted effect of the audio signal on the audio transducer, and controlling operation of a thermal protection subsystem configured to protect the audio transducer from overheating based on the audio heating metric.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, and acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively, an electronic device may have a connector, e.g., a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal will generally be an analog time varying voltage signal, for example, a time varying waveform.

Figure 1:
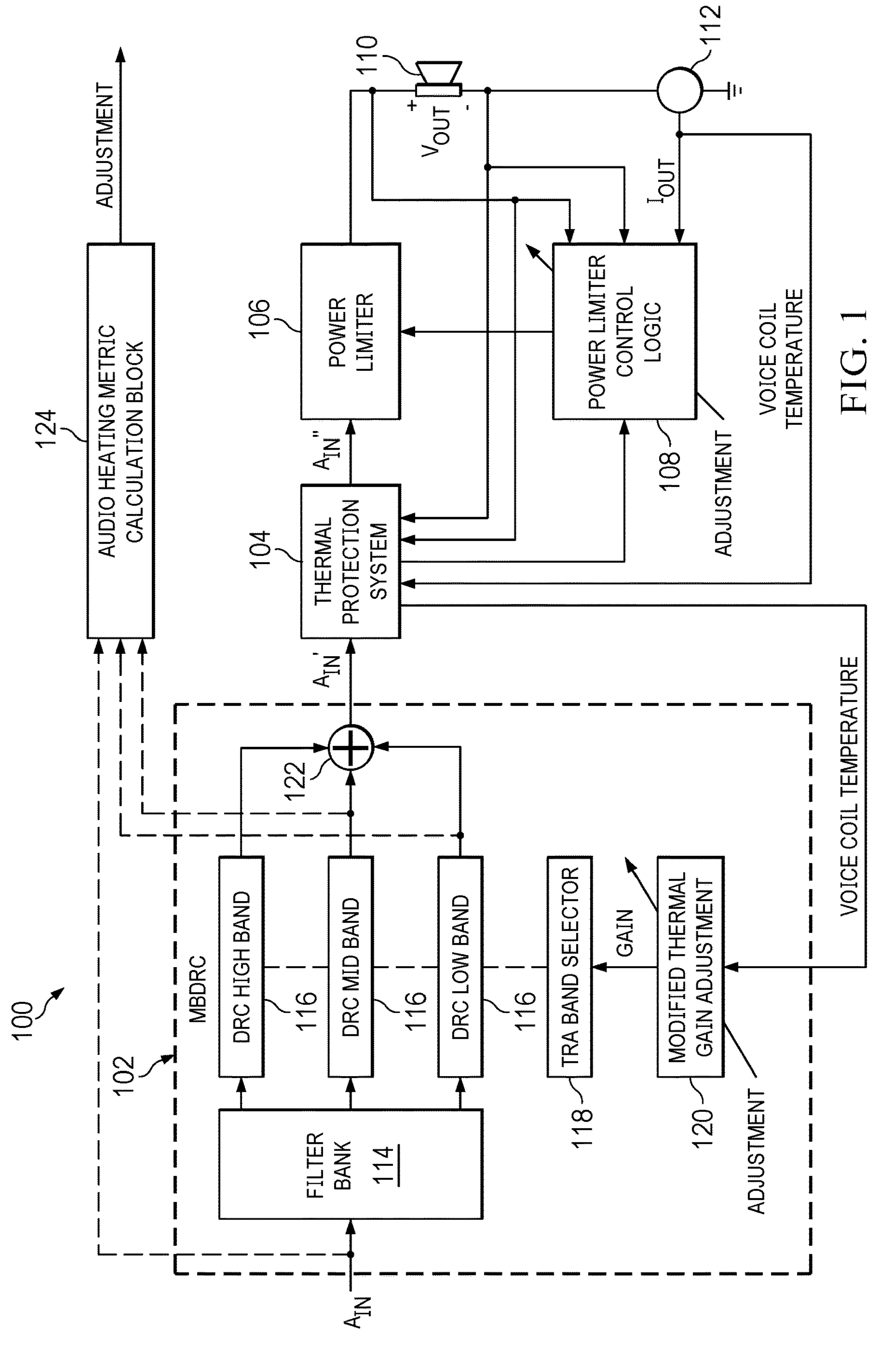
FIG. 1 illustrates selected components of an example audio system, in accordance with embodiments of the present disclosure.

FIG. 1 illustrates selected components of an example audio system 100, in accordance with embodiments of the present disclosure. As shown in FIG. 1, audio system 100 may include a thermal-controlled multi-band dynamic range compressor (MBDRC) 102, a thermal protection system 104, a power limiter 106, power limiter control logic 108, a speaker 110, a current sensor 112, and an audio heating metric calculation block 124.

As shown in FIG. 1, MBDRC 102 may receive an input audio signal $A_{IN}$ (which may comprise a digital signal), separate audio signal $A_{IN}$ into a plurality of bands, selectively apply a modified thermal gain adjustment to one or more of such bands, and recombine the bands (as modified), for further processing by thermal protection system 104 and power limiter 106 before being driven to speaker 110. Accordingly, MBDRC 102 may include a filter bank 114 configured to filter input audio signal $A_{IN}$ into a plurality of bands. For example, in the embodiments represented by FIG. 1, filter bank 114 may separate input audio signal $A_{IN}$ into a low-frequency band, a mid-frequency band, and a high-frequency band. MBDRC 102 may also include a dynamic range compressor (DRC) 116 for each respective band, such that, when a particular frequency band is selected for temperature-based dynamic range compression by thermal rate adjustment (TRA) band selector 118, the DRC 116 associated with such frequency band may compress (e.g., attenuate) the content of input audio signal $A_{IN}$ within such frequency band by a programmable temperature-based gain determined by modified thermal gain adjustment block 120. As described in greater detail below, parameters (e.g., maximum gain values, temperature thresholds for gain adjustment) of modified thermal gain adjustment block 120 may be varied, in turn affecting operation and/or application of the gain calculation by modified thermal gain adjustment block 120, based on an audio heating metric calculated by audio heating metric calculation block 124.

After temperature-based dynamic range compression (if any) is applied to the various bands, combiner 122 may recombine the bands into a modified input signal $A_{IN}$.

Although DRCs 116 may be used for respective bands of input audio signal $A_{IN}$, it is understood that in some embodiments of the present disclosure, DRCs 116 may not be present, but TRA band selector 118 and thermal gain adjustment block 120 may still be capable of (e.g., in concert with other components not explicitly shown) performing functionality similar or identical to that described herein. For example, in some embodiments, the whole of filter bank 114 and DRC 116 may be replaced by a Fast Fourier Transform (FFT) block. In such case, TRA band selector 118 may be applied on arbitrary frequency bins, such that TRA band selector 118 becomes a frequency bin selector.

Figure 2:
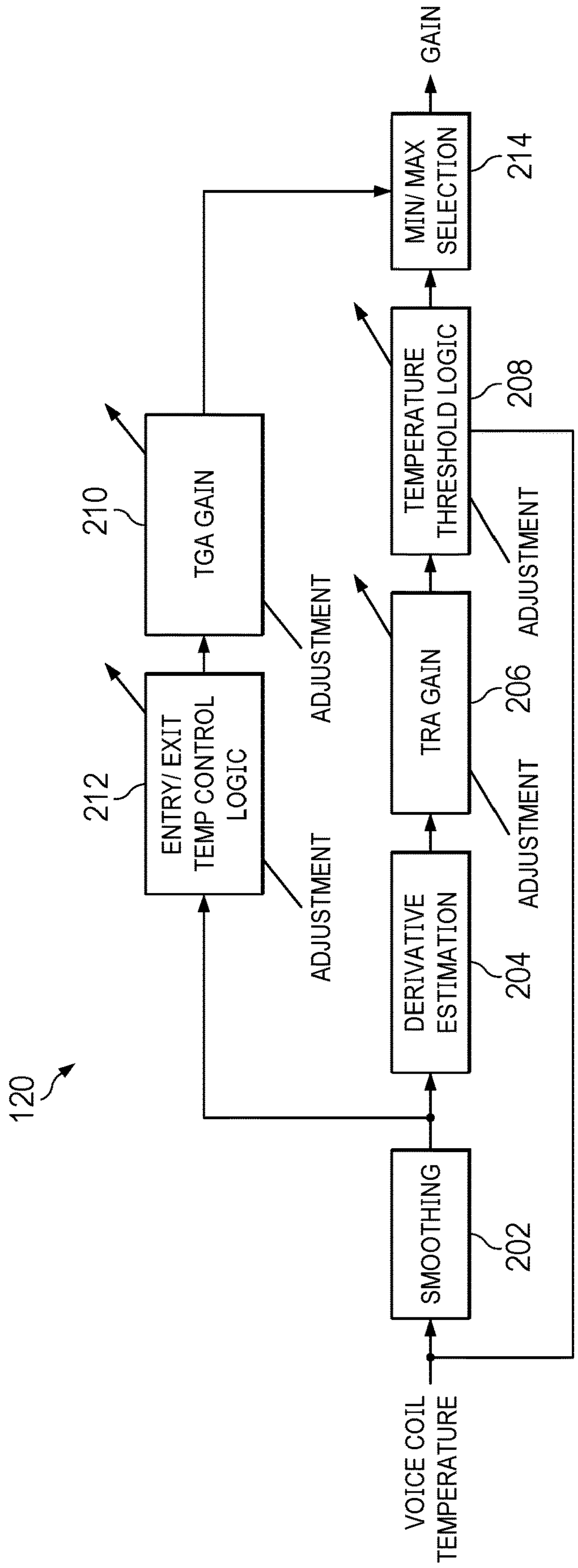
FIG. 2 illustrates selected components of an example modified thermal gain adjustment block in accordance with embodiments of the present disclosure.

Turning briefly to FIG. 2, example functionality of modified thermal gain adjustment block 120 is described. As shown in FIG. 2, modified thermal gain adjustment block 120 may receive a signal indicative of a voice coil temperature of or proximate to a voice coil of speaker 110. For example, such voice coil temperature may be estimated by thermal protection system 104 based on a monitored output voltage $V_{OUT}$ and output current $I_{OUT}$ of speaker 110 (as sensed by current sensor 112), as described in greater detail below. As another example, such voice coil temperature may be derived from a temperature sensor (e.g., a thermistor), which may be the case in embodiments of audio system 100 not having a thermal protection system.

As shown in FIG. 2, a smoothing filter 202 may low-pass filter voice coil temperature readings before being processed by two different gain paths. In a first path, a derivative estimation block 204 may calculate a mathematical derivative of (e.g., the time rate of change of) the smoothed voice coil temperature. Based on the mathematical derivative of the smoothed voice coil temperature, thermal rate adjustment (TRA) gain block 206 may determine a first gain (e.g., attenuation), which may in some embodiments be a linear gain, that may be applied to a band of input audio signal $A_{IN}$. For example, such attenuation may increase as the mathematical derivative of the smoothed voice coil temperature increases and may decrease as the mathematical derivative of the smoothed voice coil temperature decreases. Thus, more attenuation may be applied when the voice coil temperature is quickly rising. However, because a high level of thermal change may happen when the voice coil temperature is at a low, non-dangerous level, temperature threshold logic 208 may pass the gain calculated by TRA gain block 206 if the voice coil temperature is above a threshold temperature, and may otherwise output a unity gain (e.g., apply no attenuation) when the voice coil temperature is below the threshold temperature.

When the voice coil temperature is in steady-state, the first gain generated by the first path may be ineffective to provide a desired reshaping of the thermal response of speaker 110, so as to avoid excessive thermal attenuation response of thermal protection system 104 and/or power limiter 106. Accordingly, in the second path of modified thermal gain adjustment block 120, thermal gain adjustment (TGA) gain block 210 may determine a second gain (e.g., attenuation), which may in some embodiments be a linear gain, that may be applied to a band of input audio signal $A_{IN}$ based on the smoothed voice coil temperature generated by smoothing filter 202. Such second path may also include a temperature threshold entry/exit control logic 212 (e.g., hysteresis) such that TGA gain block 210 may be enabled and disabled based on a lower temperature threshold and higher temperature threshold to avoid frequent decision fluctuation. Accordingly, when TGA gain block 210 is disabled, it may output a unity gain (e.g., no attenuation). A minimum/maximum selector 214 may select the minimum of the first gain (from the first path) and the second gain (from the second path) (i.e., select the maximum attenuation).

As also shown in FIG. 2, TRA gain 206, TGA gain 210, a temperature threshold for temperature threshold logic 208, entry-exit temperature control logic 212, and/or other parameters of modified thermal gain adjustment block 120 may be varied based on the audio heating metric calculated by audio heating metric calculation block 124, as described in greater detail below.

Turning back to FIG. 1, TRA band selector 118 may select a band for attenuation (which may be the low-frequency band for most audio applications) and apply the gain calculated by modified thermal gain adjustment block 120 to the DRC 116 for such band. In some embodiments, TRA band selector 118 may select the band for attenuation based on characterization of a temperature response and/or amplitude response of the speaker 110 as a function of frequency across a plurality of frequency bands. For example, because audio micro-speakers often have lower efficiency at lower (e.g., bass) frequencies, in some embodiments, TRA band selector 118 may generally select lower-frequency bands for attenuation.

Figure 3:
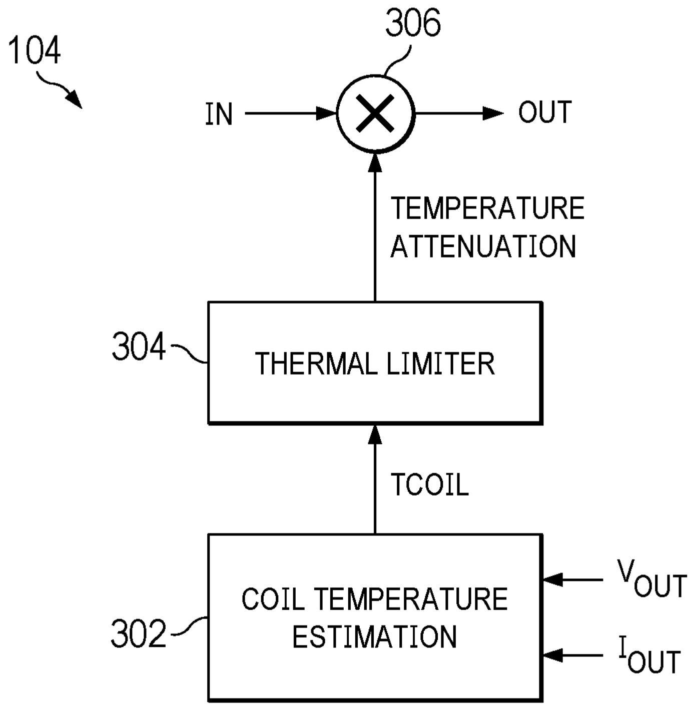
FIG. 3 illustrates selected components of an example thermal protection system in accordance with embodiments of the present disclosure.

Thermal protection system 104 may include any system, device, or apparatus configured to attenuate the full band of an audio signal based on a measured or estimated voice coil temperature of speaker 110, in order to protect speaker 110 from thermal damage. For example, in some embodiments, thermal protection system 104 may be implemented using systems and methods identical to or similar to that described in U.S. Pat. No. 10,356,522, which is incorporated by reference herein in its entirety. FIG. 3 illustrates selected components of an example thermal protection system 104 in accordance with embodiments of the present disclosure. As shown in FIG. 3, a coil temperature estimator 302 may receive signals indicative of output voltage $V_{OUT}$ across speaker 110 and output current $I_{OUT}$ through speaker 110 and based thereon, estimate a voice coil temperature of speaker 110. Alternatively, in some embodiments, coil temperature estimator 302 may receive input signal IN of thermal protection system 104 and estimate a temperature. Based on such temperature and/or a rate of change of such temperature, a thermal limiter 304 may determine a temperature attenuation which may be applied to an input signal of thermal protection system 104 by a gain element 306 (e.g., an amplifier) to generate an output signal. In some embodiments, thermal limiter 304 may determine the temperature attenuation at least in part based on the audio heating metric calculated by audio heating metric calculation block 124. Accordingly, turning again briefly to FIG. 1, thermal protection system 104 may receive modified input signal $A_{IN}'$ and apply a temperature based attenuation to the full band of modified input signal $A_{IN}'$ to generate temperature-attenuated signal $A_{IN}''$.

Although audio system 100 is shown as including thermal protection system 104, it is noted that in some embodiments, thermal protection system 104 may not be present, in which case modified input signal $A_{IN}$ may be passed directly to power limiter 106 or thermal protection system 104 may be replaced by a gain element (e.g., an amplifier) having unity gain.

Power limiter 106 may comprise any suitable system, device, or apparatus (e.g., an amplifier) configured to apply an attenuation based on a level of power consumed by speaker 110 in order to maintain power consumption of speaker 110 at or below a target power limit, even after gain adjustments applied by MBDRC 102 and/or thermal protection system 104. Power limiter control logic 108 may calculate such gain based on a calculated power consumption by speaker 110 and the target power limit. As described in greater detail below, parameters (e.g., maximum gain values, temperature thresholds for gain adjustment) of power limiter control logic 108 may be varied, in turn affecting operation and/or application of the gain calculation by power limiter control logic 108, based on an audio heating metric calculated by audio heating metric calculation block 124.

Figure 4:
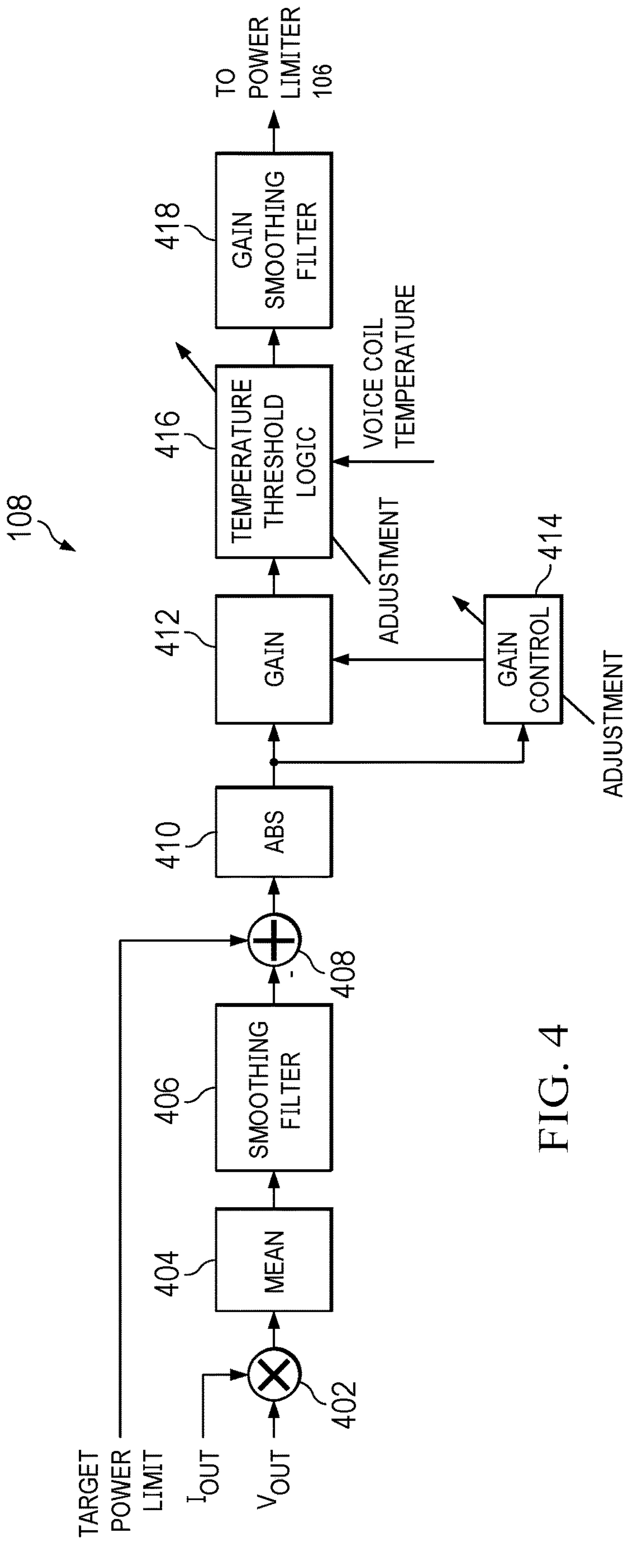
FIG. 4 illustrates selected components of an example power limiter control logic, in accordance with embodiments of the present disclosure.

FIG. 4 illustrates selected components of an example power limiter control logic 108, in accordance with embodiments of the present disclosure. As shown in FIG. 4, a multiplier 402 may multiply output voltage $V_{OUT}$ and output current $I_{OUT}$ to determine a power consumption of speaker 110. In other embodiments, power limiter control logic 108 may be configured to receive input signal $A_{IN}$ and may estimate power consumption from input signal $A_{IN}$. A mean calculation block 404 may calculate an average of a predefined number of trailing samples of the calculated power (e.g., via an accumulate and divide operation) to generate an average power consumption, and a smoothing filter 406 may low-pass such average power consumption to smooth the calculation of the average power. A combiner 408 may subtract the smoothed average power from the target power limit to generate an error signal ERROR, and an absolute value block 410 may calculate the absolute value of such error.

A gain update block 412 may calculate a gain based on the error signal. Under the control of gain control block 414, such calculated gain may be updated when the error signal is above a threshold value, such updated gain equal to the previous value of the sample minus the product of a multiplicative step factor and the error signal (e.g., Gain=Gain−μ·ERROR). In some embodiments, such step factor may also be based on the error. For example, in some embodiments, a smaller value of step factor may be used above the threshold value of the error but below a second threshold value greater than the threshold value, and a larger value of step factor may be used for error signals above the second threshold value.

As also shown in FIG. 4, functionality of gain control block 414 may be varied based on the audio heating metric calculated by audio heating metric calculation block 124, which may in turn vary the gain and/or other parameters of power limiter control logic 108 as a function of the audio heating metric, as described in greater detail below.

Temperature threshold control logic 416 may pass the gain generated by gain block 412 if the voice coil temperature is above a threshold temperature, and may otherwise output a unity gain (e.g., apply no attenuation) when the voice coil temperature is below the threshold temperature. Although not shown explicitly in FIG. 4, in some embodiments, temperature threshold control logic 416 may employ multiple thresholds, in order to implement a hysteresis to prevent frequent decision fluctuation between passing the gain generated by gain block 412 and the unity gain. In some embodiments, the temperature threshold(s) and hysteresis may be varied based on audio heating metrics.

A gain smoothing filter 418 may low-pass filter the gain value generated by temperature threshold control logic 416, the resulting smoothed gain communicated to power limiter 106 to be applied to temperature-attenuated signal $A_{IN}'$ in order to generate output voltage $V_{OUT}$.

Turning again to FIG. 1, audio heating metric calculation block 124 may comprise any suitable system, device, or apparatus configured to receive one or more of input signal $A_{IN}$, the output of DRC 116 associated with mid-band frequencies, and the output of DRC 116 associated with low-band frequencies, and based on such inputs, calculate an audio heating metric indicative of whether the current playback of input signal $A_{IN}$ has properties that tend to cause heating of the voice coil of speaker 110, and based on the audio heating metric, determine an adjustment, if any, to apply to any combination of modified thermal gain adjustment block 120, TRA band selector 118, thermal protection system 104, and power limiter control logic 108. Thus, audio heating metric calculation block 124 may provide basic content-aware capability in controlling selective acoustic optimization. For example, when audio heating metric calculation block 124 determines that a section of input signal $A_{IN}$ has properties that tend to cause heating of the voice coil of speaker 110, audio heating metric calculation block 124 may cause, via modified thermal gain adjustment block 120, TRA band selector 118, thermal protection system 104, and/or power limiter control logic 108, selective acoustic optimization within audio system 100 to be more aggressive. As a specific example, if audio heating metric calculation block 124 determines that a section of input signal $A_{IN}$ has properties that tend to cause heating of the voice coil of speaker 110, audio heating metric calculation block 124 may cause selective acoustic optimization to be triggered more quickly and/or to apply a larger maximum gain limit. Further, when cooler properties are detected within input signal $A_{IN}$, audio heating metric calculation block 124 may switch adjustment back to a default or less aggressive mode (e.g., with smaller maximum gain limits and/or with higher temperature thresholds to trigger such optimization slower). Example implementations for audio heating metric calculation block 124 are described in greater detail below with respect to FIGS. 5-8.

Although audio system 100 is shown as including power limiter 106, it is noted that in some embodiments, power limiter 106 may not be present, in which case modified input signal $A_{IN}'$ or temperature-attenuated signal $A_{IN}''$ may be passed directly to speaker 110, or power limiter 106 may be replaced by a gain element (e.g., an amplifier) having unity gain.

In accordance with the methods and systems described above, MBDRC 102 may adaptively remove certain frequency components (e.g., bass frequencies) of an audio signal based upon a temperature or rate of change of temperature of the voice coil of speaker 110. Such adaptive removal of certain frequency components may minimize heating of speaker 110, while also minimizing full band attenuation that may occur using thermal protection system 104 and/or power limiter 106. As a result, the sound pressure level and dynamics of speaker 110 may be improved over existing techniques, and undesirable effects of existing techniques, such as thermal pumping, may be reduced or eliminated. In addition or alternatively, the systems and methods described herein may enable speaker 110 to maintain an equivalent loudness in some cases while consuming less power, as compared to existing approaches, as these systems and methods may increase overall acoustic efficiency of speaker 110 by optimizing the voltage signal driven to speaker 110.

Although the foregoing contemplates use of MBDRC 102 in connection with an audio system for playback of an audio signal to an audio speaker, it is understood that the systems and methods described herein may also be applied to any other suitable speaker, including, without limitation, a linear resonant actuator or other haptic actuator.

Further, although FIG. 1 depicts speaker 110 being driven in a single-ended configuration and depicts current sensor 112 in a single-ended configuration for the purposes of clarity and exposition, it is understood that the systems and methods described herein may be applied to a speaker driven in a differential output configuration and/or a current sensor in a differential configuration.

In some embodiments, audio system 100 may include thermal protection system 104 without MBDRC 102 and power limiter 106. In such cases, thermal protection system 104 may operate based on audio heating metrics.

Figure 5:
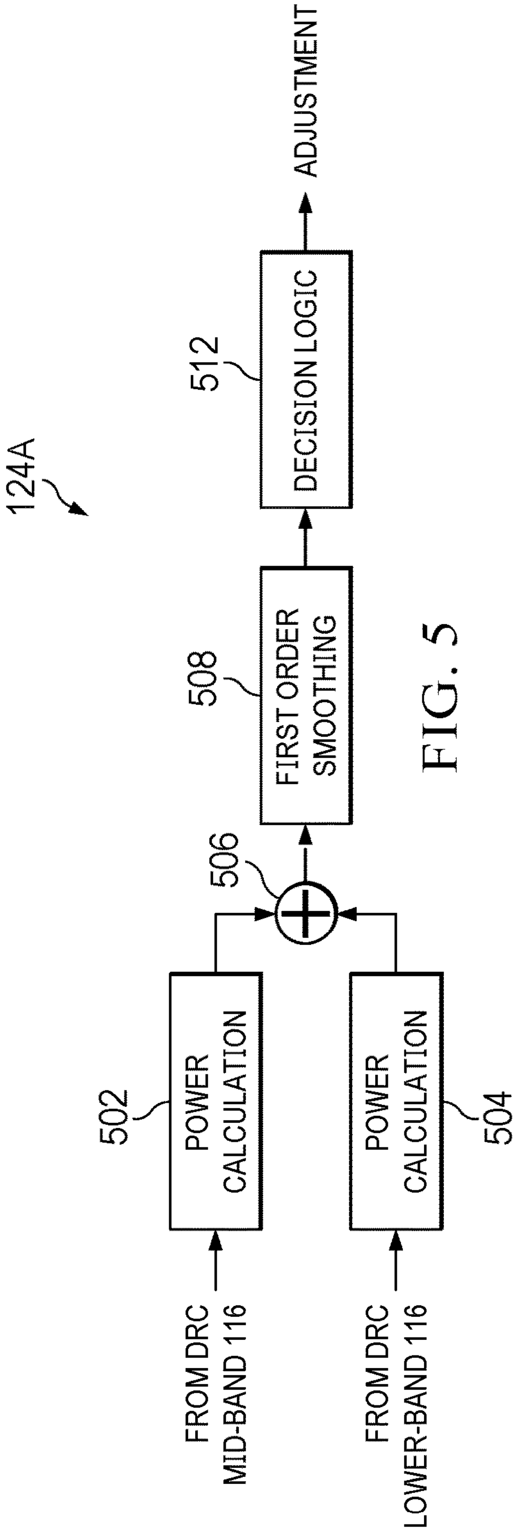
FIG. 5 illustrates selected components of an example audio heating metric calculation block employing calculation of a subband energy-based audio metric, in accordance with embodiments of the present disclosure.

FIG. 5 illustrates selected components of an example audio heating metric calculation block 124A, which may be used to implement audio heating metric calculation block 124 depicted in FIG. 1, employing calculation of a subband energy-based audio metric, in accordance with embodiments of the present disclosure. As shown in FIG. 5, power calculation blocks 502 and 504 may respectively receive the outputs of mid-band DRC 116 and low-band DRC 116 (or alternatively, directly receive the lower and middle bands from the output of filter bank 114), and calculate the power present in each of such bands. A summer 506 may sum the power of the mid-band and low-band, and a smoothing filter 508 may apply first-order smoothing to the sum. Decision logic 512 may compare the filtered sum to a pre-defined threshold and based on the comparison, determine an adjustment (e.g., one or more modifications to maximum gain limits, temperature thresholds, or power thresholds), if any, to apply to any combination of modified thermal gain adjustment block 120, TRA band selector 118, thermal protection system 104, and power limiter control logic 108.

Figure 6:
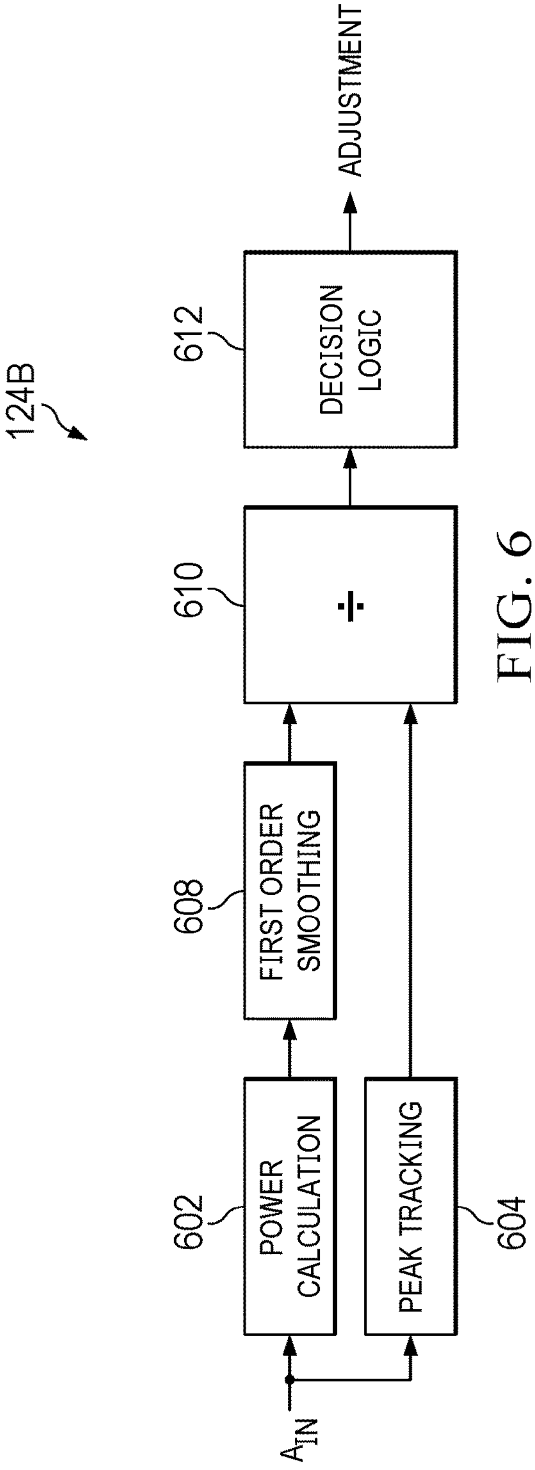
FIG. 6 illustrates selected components of an example audio heating metric calculation block employing calculation of an average-to-peak-power-based audio metric, in accordance with embodiments of the present disclosure.

FIG. 6 illustrates selected components of an example audio heating metric calculation block 124B, which may be used to implement audio heating metric calculation block 124 depicted in FIG. 1, employing calculation of an average-to-peak-power-based audio metric, in accordance with embodiments of the present disclosure. As shown in FIG. 6, a power calculation block 602 may receive audio input signal $A_{IN}$ and calculate the average power present in audio input signal $A_{IN}$ and a smoothing filter 608 may apply first-order smoothing to the average power calculation. Further, a peak tracking block 604 may receive audio input signal $A_{IN}$ and calculate the peak power present in audio input signal $A_{IN}$. A divider 610 may divide the filtered average power calculation by the peak power calculation to generate an average power-to-peak ratio for audio input signal $A_{IN}$. Decision logic 612 may compare the average power-to-peak ratio to a pre-defined threshold and based on the comparison, determine an adjustment (e.g., one or more modifications to maximum gain limits, temperature thresholds, or power thresholds), if any, to apply to any combination of modified thermal gain adjustment block 120, TRA band selector 118, thermal protection system 104, and power limiter control logic 108.

In addition or alternatively to using the average power-to-peak ratio, similar approaches may be used that employ a peak-to-average-power ratio, a peak-power-to-root-mean-square ratio, or root-mean-square-to-peak-power ratio.

Figure 7:
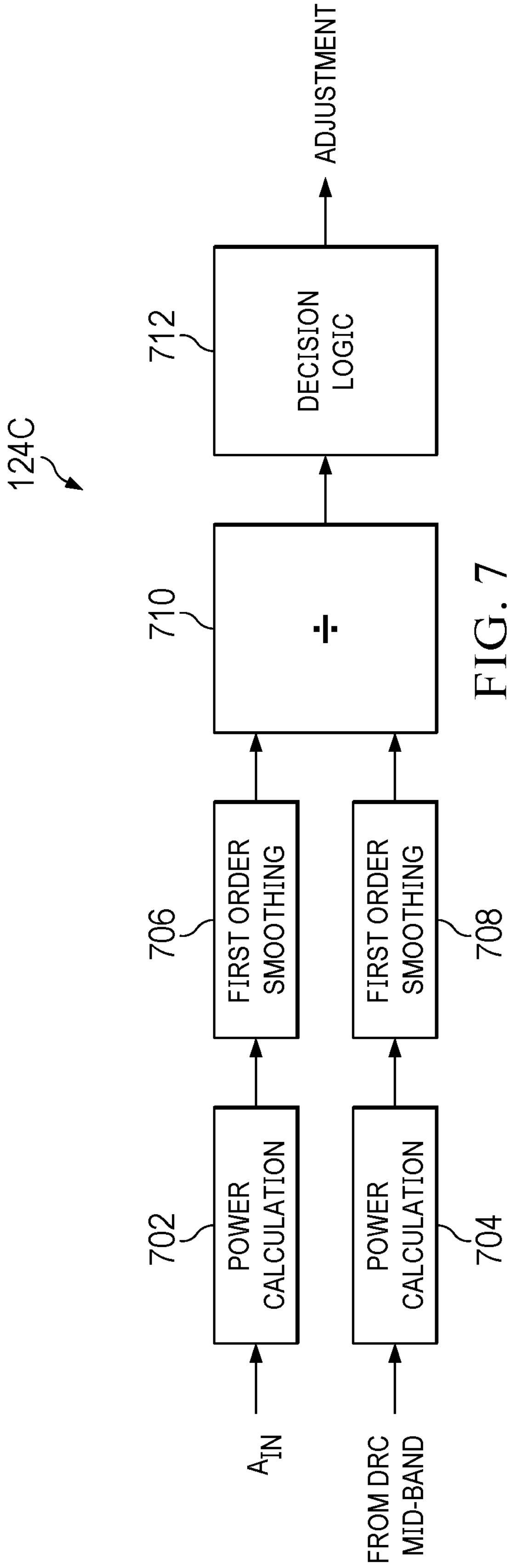
FIG. 7 illustrates selected components of an example audio heating metric calculation block employing calculation of a subband energy ratio-based audio metric, in accordance with embodiments of the present disclosure.

FIG. 7 illustrates selected components of an example audio heating metric calculation block 124C, which may be used to implement audio heating metric calculation block 124 depicted in FIG. 1, employing calculation of a subband energy ratio-based audio metric, in accordance with embodiments of the present disclosure. As shown in FIG. 7, a power calculation block 702 may receive audio input signal $A_{IN}$ and calculate the average power present in audio input signal $A_{IN}$ and a smoothing filter 706 may apply first-order smoothing to the average power calculation. Similarly, a power calculation block 704 may receive the output of mid-band DRC 116 (or the mid-band output from filter bank 114) and calculate a power present in such band, and a smoothing filter 708 may apply first-order smoothing to the calculation of mid-band power. A divider 710 may divide the mid-band power calculation by the average power calculation to generate a subband energy ratio for audio input signal $A_{IN}$. Decision logic 712 may compare the subband energy ratio to a pre-defined threshold and based on the comparison, determine an adjustment (e.g., one or more modifications to maximum gain limits, temperature thresholds, or power thresholds), if any, to apply to any combination of modified thermal gain adjustment block 120, TRA band selector 118, thermal protection system 104, and power limiter control logic 108. Although the foregoing contemplates that power calculation block 704 receives and calculates a subband power for the mid-band of audio input signal $A_{IN}$, in some embodiments, a different subband may be used.

Figure 8:
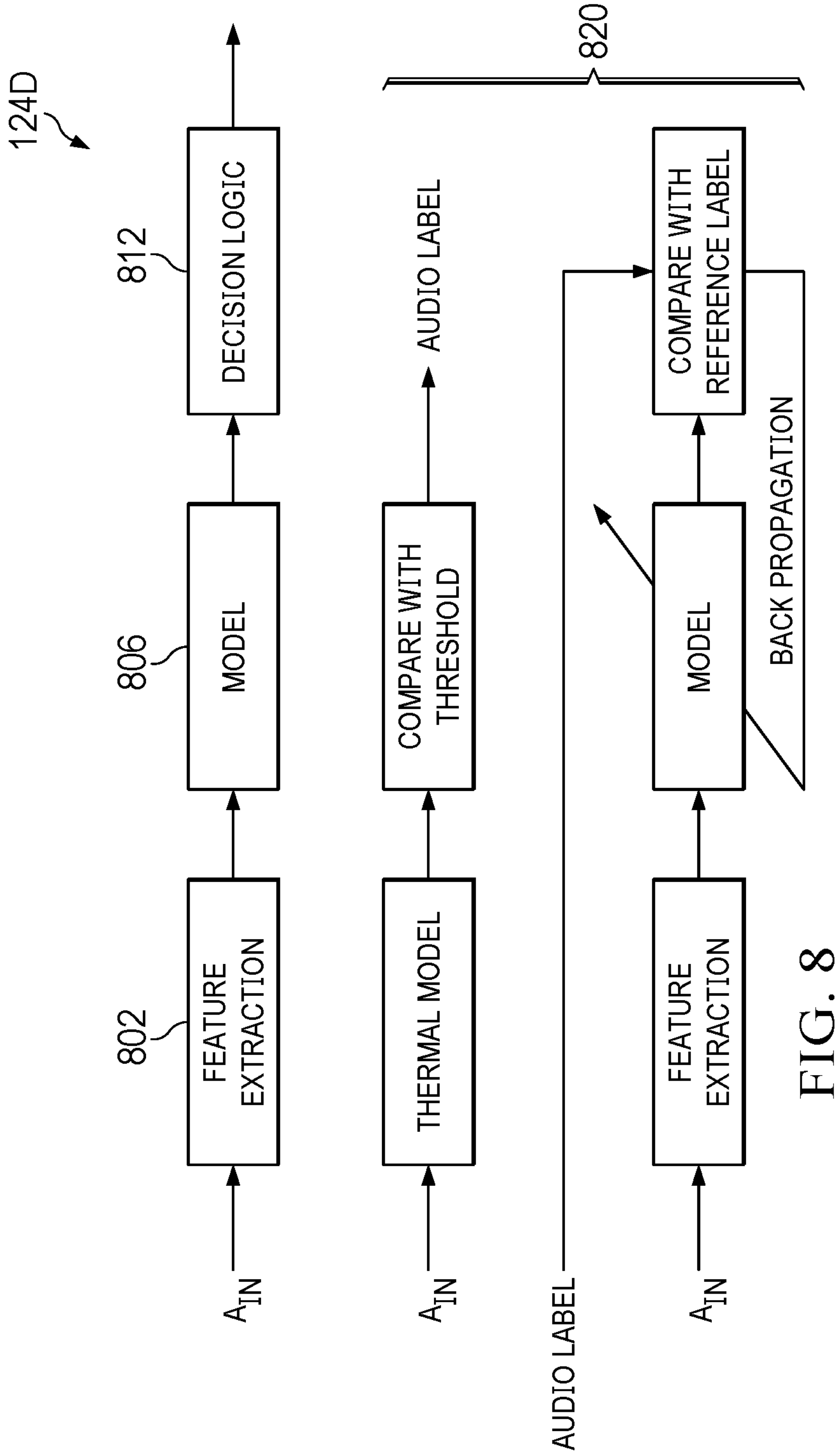
FIG. 8 illustrates selected components of an example audio heating metric calculation block employing calculation of a classification-based audio metric, in accordance with embodiments of the present disclosure.

FIG. 8 illustrates selected components of an example audio heating metric calculation block 124D, which may be used to implement audio heating metric calculation block 124 depicted in FIG. 1, employing calculation of a classification-based audio metric, in accordance with embodiments of the present disclosure. As shown in FIG. 8, a feature extraction module 802 may extract one or more features (e.g., Mel-frequency cepstral coefficients, crest factor, energy ratio, zero crossing, etc.) from audio input signal $A_{IN}$. A model 806 may receive the one or more features and classify audio input signal $A_{IN}$ based on the features. In some embodiments, model 806 may be obtained from a machine learning algorithm, such as machine learning algorithm 820. Based on the classification of audio input signal $A_{IN}$, decision logic 812 may determine an adjustment (e.g., one or more modifications to maximum gain limits, temperature thresholds, or power thresholds), if any, to apply to any combination of modified thermal gain adjustment block 120, TRA band selector 118, thermal protection system 104, and power limiter control logic 108.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An audio system comprising:

an audio transducer;

a thermal protection subsystem configured to protect the audio transducer from overheating; and a control subsystem communicatively coupled to the thermal protection subsystem and configured to:

receive an audio signal for playback at the audio transducer;

determine an audio heating metric indicative of a predicted effect of the audio signal on the audio transducer, wherein the audio heating metric is based on a model-based classification of the audio signal; and control operation of the thermal protection subsystem based on the audio heating metric, wherein controlling operation of the thermal protection subsystem based on the audio heating metric comprises either or both of (i) controlling a gain limit associated with the thermal protection system and (ii) controlling a threshold associated with the thermal protection subsystem.

2. The audio system of claim 1, wherein controlling operation of the thermal protection subsystem based on the audio heating metric comprises controlling a gain associated with the thermal protection subsystem.

3. The audio system of claim 1, wherein the threshold comprises a threshold temperature for determining whether to apply thermal protection by the thermal protection subsystem.

4. The audio system of claim 1, wherein controlling operation of the thermal protection subsystem based on the audio heating metric comprises determining which subbands of the audio signal to apply thermal protection.

5. A method comprising:

receiving an audio signal for playback at an audio transducer;

determining an audio heating metric indicative of a predicted effect of the audio signal on the audio transducer, wherein the audio heating metric is based on a model-based classification of the audio signal; and controlling operation of a thermal protection subsystem configured to protect the audio transducer from overheating based on the audio heating metric, wherein controlling operation of the thermal protection subsystem based on the audio heating metric comprises either or both of (i) controlling a gain limit associated with the thermal protection system and (ii) controlling a threshold associated with the thermal protection subsystem.

6. The method of claim 5, wherein controlling operation of the thermal protection subsystem based on the audio heating metric comprises controlling a gain associated with the thermal protection subsystem.

7. The method of claim 5, wherein the threshold comprises a threshold temperature for determining whether to apply thermal protection by the thermal protection subsystem.

8. The method of claim 5, wherein controlling operation of the thermal protection subsystem based on the audio heating metric comprises determining which subbands of the audio signal to apply thermal protection.

* * * * *